US009432869B2

(12) United States Patent
Dillinger et al.

(10) Patent No.: US 9,432,869 B2
(45) Date of Patent: Aug. 30, 2016

(54) INTRA-FREQUENCY AND INTER-FREQUENCY MEASUREMENTS IN A RADIO COMMUNICATION SYSTEM

(75) Inventors: Markus Dillinger, Oberhaching (DE); Jijun Luo, Munich (DE); Jianming Pan, Vienna (AT); Egon Schulz, Munich (DE); Peter Slanina, Judenau (AT)

(73) Assignee: CELLULAR COMMUNICATIONS EQUIPMENT LLC, Plano, TX (US)

( * ) Notice: Subject to any disclaimer, the term of this patent is extended or adjusted under 35 U.S.C. 154(b) by 1552 days.

(21) Appl. No.: 12/084,133

(22) PCT Filed: Sep. 26, 2006

(86) PCT No.: PCT/EP2006/066734
§ 371 (c)(1),
(2), (4) Date: Mar. 24, 2009

(87) PCT Pub. No.: WO2007/048673
PCT Pub. Date: May 3, 2007

(65) Prior Publication Data
US 2009/0253458 A1    Oct. 8, 2009

(30) Foreign Application Priority Data
Oct. 25, 2005 (EP) .................................. 05023264

(51) Int. Cl.
*H04W 4/00* (2009.01)
*H04J 1/00* (2006.01)
*H04W 24/10* (2009.01)

(52) U.S. Cl.
CPC .................................. *H04W 24/10* (2013.01)

(58) Field of Classification Search
CPC ........... H04W 24/10; H04W 36/0088; H04W 36/0094; H04W 36/30; H04W 72/085
USPC ........................................................ 370/318
See application file for complete search history.

(56) References Cited

U.S. PATENT DOCUMENTS 4,092,594 A * 5/1978 Baker ......................... 455/154.2
5,287,354 A * 2/1994 Teel et al. ..................... 370/338
(Continued)

FOREIGN PATENT DOCUMENTS

CN    1411310    4/2003
CN    1503592    6/2004
(Continued)

OTHER PUBLICATIONS

M. Benson et al., "Investigation of the UMTS to GSM handover procedure" Vehicular Technology Conference, IEEE, May 6, 2002; pp. 1829-1833.
(Continued)

*Primary Examiner* — Gerald Smarth
(74) *Attorney, Agent, or Firm* — Procopio, Cory, Hargreaves & Savitch, LLP

(57) ABSTRACT

In a method for wireless communication, a receiver receives a first signal at a first radio frequency and determines the reception level of the first signal. The receiver receives data during a reception level of the first signal at the first radio frequency. The receiver decides, based on the determined reception level, whether at least one measurement is to be taken on a second signal transmitted at a second radio frequency. A radio station carries out the method.

12 Claims, 2 Drawing Sheets

(56) References Cited

U.S. PATENT DOCUMENTS

| | | | | |
|---|---|---|---|---|
| 5,754,959 A * | 5/1998 | Ueno et al. | ............ | 455/453 |
| 6,208,858 B1 * | 3/2001 | Antonio et al. | ............ | 455/429 |
| 6,236,365 B1 * | 5/2001 | LeBlanc et al. | ............ | 342/457 |
| 6,349,094 B1 * | 2/2002 | Vastano et al. | ............ | 370/328 |
| 6,567,670 B1 * | 5/2003 | Petersson | ............ | 455/522 |
| 6,714,780 B1 * | 3/2004 | Antonio et al. | ............ | 455/425 |
| 7,016,320 B1 * | 3/2006 | Petersson et al. | ............ | 370/331 |
| 2002/0058481 A1 * | 5/2002 | Mohebbi | ............ | 455/67.1 |
| 2003/0069037 A1 | 4/2003 | Kiyomoto et al. | | |
| 2003/0218995 A1 * | 11/2003 | Kim et al. | ............ | 370/318 |
| 2004/0005890 A1 * | 1/2004 | Holma et al. | ............ | 455/424 |
| 2004/0235478 A1 * | 11/2004 | Lindquist | ............ | H04W 36/0083 455/440 |
| 2004/0264561 A1 * | 12/2004 | Alexander et al. | ............ | 375/232 |
| 2005/0221824 A1 * | 10/2005 | Lee et al. | ............ | 455/435.2 |
| 2005/0260991 A1 * | 11/2005 | Hayata | ............ | H04W 36/12 455/436 |
| 2005/0288017 A1 * | 12/2005 | Doumenc et al. | ............ | 455/435.3 |
| 2006/0025137 A1 * | 2/2006 | Ormson | ............ | 455/436 |
| 2007/0004445 A1 * | 1/2007 | Dorsey et al. | ............ | 455/525 |

FOREIGN PATENT DOCUMENTS

| | | |
|---|---|---|
| EP | 1 424 862 | 6/2004 |
| GB | 2 339 994 | 2/2000 |
| RU | 2115241 | 7/1998 |

OTHER PUBLICATIONS

"Part 11: Wireless LAN Medium Access Control (MAC) and Physical Layer (PHY) Specifications," ANSI/IEEE Std 802.11, 1999 Edition, 527 pages.

\* cited by examiner

INTRA-FREQUENCY AND INTER-FREQUENCY MEASUREMENTS IN A RADIO COMMUNICATION SYSTEM

CROSS REFERENCE TO RELATED APPLICATIONS

This application is based on and hereby claims priority to European Application No. EP05023264, filed on Oct. 25, 2005 and PCT Application No. PCT/EP2006/066734, filed on Sep. 26, 2006, the contents of which are hereby incorporated by reference.

BACKGROUND OF THE INVENTION

In a method for communicating by radio, a receiver receives a first signal at a first radio frequency and determines the received level of the signal.

In radio communication systems, messages, for example comprising voice information, image information, video information, SMS (Short Message Service), MMS (Multimedia Messaging Service) or other data are transmitted via a radio interface between transmitting and receiving station with the aid of electromagnetic waves. Depending on the actual embodiment of the radio communication system, the stations can be different types of subscriber radio stations or radio stations in the network such as repeaters, radio access points or base stations. In a mobile radio communication system, at least some of the subscriber radio stations are mobile radio stations. The electromagnetic waves are radiated with carrier frequencies which are in the frequency band provided for the respective system.

Mobile radio communication systems are frequently embodied as cellular systems, e.g. in accordance with the GSM (Global System for Mobile Communication) standard or UMTS (Universal Mobile Telecommunications System), with a network infrastructure including, e.g., of base stations, facilities for supervising and controlling the base stations and other facilities in the network. Apart from these cellular hierarchic radio networks organized over a wide area (supralocal), there are also wireless local area networks (WLANs) with a radio coverage area which, as a rule, is much more limited in space.

Examples of various standards for WLANs are HiperLAN, DECT, IEEE 802.11, Bluetooth and WATM.

Many subscriber radio stations can communicate in different frequency ranges, if necessary by using different radio technologies. Before such a communication takes place, it is required, as a rule, that the radio station performs measurements on signals of the respective frequency range. However, it is frequently complex for a radio station currently communicating in a first frequency range to perform measurements in a second frequency range.

SUMMARY

One potential object is to present an efficient method for communication by radio in which a receiver receives and measures a signal at a first radio frequency. Furthermore, a suitable radio station for carrying out the method is to be presented.

The inventors propose a method for communicating by radioing which, a receiver receives a first signal at a first radio frequency and determines the received level. Furthermore, the receiver receives at the first radio frequency information relating to a received level of the signal. The receiver, by using the received level determined and the information relating to the received level, decides about carrying out at least one measurement on a second signal radiated at a second radio frequency.

The receiver is preferably a subscriber station. The receiver receives a signal and information relating to the received level of the signal at a first radio frequency. Depending on the actual embodiment of the radio communication system, the first radio frequency can be a narrow frequency band or a wide frequency band. It is advantageous if the receiver currently communicates at the first radio frequency, i.e., apart from the signal and the information relating to the received level of the signal, receives and evaluates further messages which are radiated at the first radio frequency and possibly also sends out messages at the first radio frequency. The first signal and the information relating to the received level of the first signal are preferably information items which are intended not only for the receiver considered but also for a multiplicity of receivers. It is possible that the information relating to the received level of the first signal is a component of the first signal or also a component of another message. The information relating to the received level of the first signal can relate, e.g., to the received level at a particular location or can be a measure of a received level averaged over a certain range.

The receiver makes the decision whether it should carry out measurements on a second signal, the second signal being radiated at a second radio frequency. The second radio frequency, like the first radio frequency, can be a narrow or a wide frequency band depending on the actual embodiment of the radio communication system. The first and the second radio frequency differ from one another, if they are frequency bands or ranges, they preferably do not have any overlaps. To decide about carrying out measurements, the received level determined and the information relating to the received level of the first signal are utilized. This means that a decision about the procedure with respect to another radio frequency is made on the basis of messages received at the first radio frequency.

It is advantageous, in particular, if an evaluation of messages of the second radio frequency is not necessary for this decision. Apart from the received level determined and the information relating to the received level of the first signal, the receiver can include further variables in the decision, if necessary.

The at least one measurement about the carrying out of which the receiver decides is preferably one or more measurements which is or are used for preparing a change of radio frequency of the receiver from the first to the second radio frequency or which can be utilized for a decision about such a change.

The level of the reception of the first signal depends on the current location of the receiver. It is advantageous, therefore, if the receiver does not move too far or fast between the time/the times of reception of the first signal and of the information relating to the received level of the first signal and the time of the decision about carrying out measurements.

As a development of the proposed method, the receiver carries out at least one measurement on the second signal if the received level determined is greater than a value indicated by the information relating to the received level. A comparison of the two received levels corresponds to an estimation of the position of the receiver at which the received level of the first signal is determined relative to a position at which the first signal is received with the level indicated by the information. It is possible that the at least one measurement is also carried out when the two received levels are equal.

According to a further development, the receiver does not perform a measurement on the second signal if the received level determined is less than a value indicated by the information relating to the received level. It is possible that no measurement is carried out even if the two received levels are equal.

The information relating to the received level is preferably radiated by the transmitter of the first signal. The second signal can be radiated by the same transmitter or another transmitter.

According to a further development, the first signal is radiated inside a first radio coverage area and the second signal is radiated inside a second radio coverage area, wherein the two radio coverage areas overlap. That the two radio coverage areas overlap means that at least a part of the first radio coverage area is also a part of the second radio coverage area. It is thus possible, for example, that the first radio coverage area is a component of the second radio coverage area or conversely. The transmitters of the two signals can be the same or different ones.

According to a preferred embodiment, the information relating to the received level comprises a measure of the received level of the first signal at the edge of the second radio coverage area. If the received level of the first signal is not of equal magnitude everywhere at the edge of the second radio coverage area, it is possible that the measure of the received level specifies the received level at a particular part of the edge or also the average value of the received level over the edge.

It is possible that the second signal is radiated by using a different radio technology than the first signal. Thus, for example, a CDMA technology according to UMTS can be used for the first signal and an OFDM (Orthogonal Frequency Division Multiplex) technology for the second signal. In this case, the receiver is preferably a multi-mode receiver which can communicate by different radio technologies successively or simultaneously.

As a development, the receiver carries out at least one measurement on the second signal wherein the at least one measurement is then used for deciding about a change from the first to the second radio frequency. After this change, the receiver continues at the second radio frequency what it has carried out at the first radio frequency before the change. If, for example, it is sending signaling information at the first radio frequency before the change, it is sending this at the second radio frequency after the change. The decision about carrying out the change can be made in this case by the receiver or by another facility which requests the receiver to carry out the change.

It is advantageous if the information relating to the received level directly indicates to another receiver that no measurements are to be carried out at the second signal. The other receiver thus evaluates the information relating to the received level as does the receiver. However, the other receiver, in contrast to the receiver, can see directly from the information that it does not have to carry out any measurements on the second signal whilst the receiver, in contrast, needs at least the received level of the first signal determined by it for the decision about carrying out measurements.

As a development of the proposed method, the information relating to the received level is first determined with the cooperation of radio stations which carry out measurements on messages radiated at the first and at the second radio frequency. By these measurements, it is possible, e.g., to determine correlations between the received level of messages of the first radio frequency in comparison with messages of the second radio frequency at particular locations.

The radio station proposed by the inventors for a radio communication system has a receiver to receive a first signal at a first radio frequency, a unit for determining the received level of the first signal, a receiver to receive information at the first radio frequency relating to a received level of the first signal, and a unit for deciding about the performance of measurements on a second signal radiated at a second radio frequency.

The radio station according to the invention is particularly suitable for carrying out the method according to the invention, wherein this can also apply to the embodiments and developments. It can have further suitable means for this purpose.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
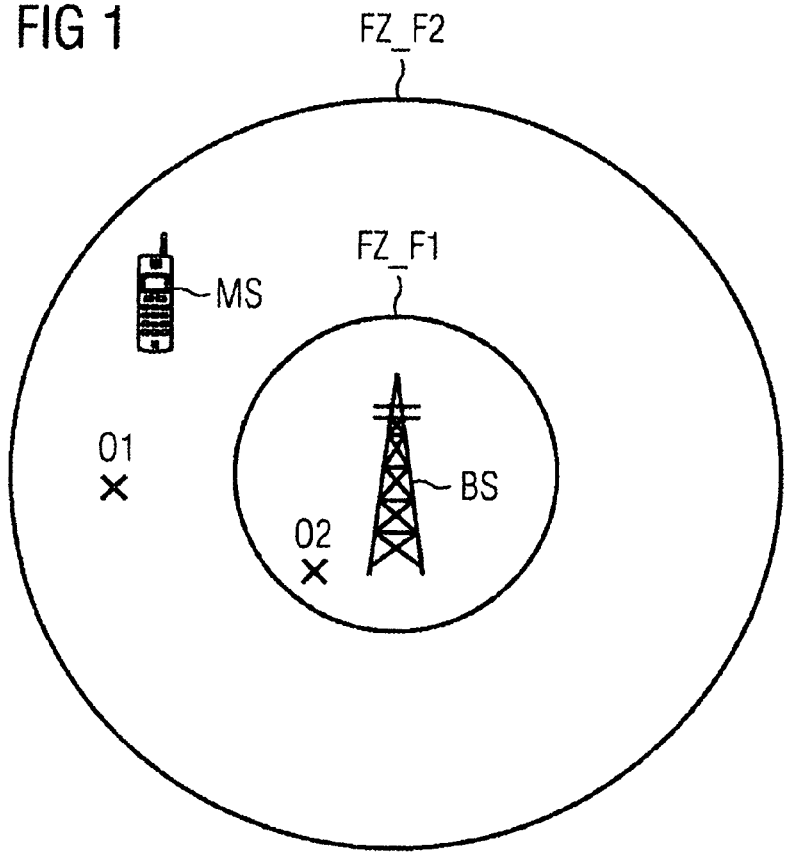
FIG. 1 shows a first section from a radio communication system.

Reference will now be made in detail to the preferred embodiments of the present invention, examples of which are illustrated in the accompanying drawings, wherein like reference numerals refer to like elements throughout.

The section from a radio communication system, shown in FIG. 1, comprises the base station BS and the subscriber station MS; further components of the radio communication system are not shown for the sake of clarity. The radio communication system considered is a system according to the UMTS standard in accordance with the FDD mode of operation. The base station BS communicates with the subscriber stations in at least two different frequency ranges, there being differently large radio coverage areas for the two different frequency ranges. There is the radio cell FZ_F2 within which the base station BS can communicate with subscriber stations in the frequency range F2, and the radio cell FZ_F1 within which the base station BS can communicate with subscriber stations in the frequency range F1.

The radio cells FZ_F2 and FZ_F1 are shown as circles in FIG. 1, which is a simplification which, as a rule, does not correspond to the form of radio cells in reality. Independently of its actual shape and size, a radio cell is understood in the text which follows to be a geographic area in which the communication between subscriber stations and a base station is possible in a certain frequency range and/or by using a certain radio technology. The situation is considered that two radio cells of different frequencies are present, one of the two radio cells being a component of the other one.

For UTRA FDD, the frequency ranges, called "core bands", of 1920-1980 MHz were defined for the upward direction, and of 2110-2170 MHz for the downward direction. To be able to take into consideration asymmetric radio traffic, the frequency range of 2500-2690 MHz is also available which can be used as "extension band" by UTRA FDD. The extension band can be used for the upward direction and the downward direction and also just for the downward direction. The frequency range F1 of FIG. 1 can be, e.g., an unpaired part of the extension band used for the FDD downward direction.

In the text which follows, it is assumed that the subscriber station MS communicates with the base station BS in one of the two frequency ranges F1 or F2. For various purposes, e.g. cell selection/reselection or handover preparation, it is necessary that the subscriber station MS performs measurements on signals of the other frequency ranges, i.e. inter-frequency measurements, sent out by the base station. Cell selection is understood to be the selection of a radio cell by a subscriber station for camping which is relevant for the "idle mode" or also for the "connected mode" in the case of "out of service". Cell reselection is understood to be the reselection of such a selection already made. Since the radio frequency currently used and the radio frequency at which the measurements are to be performed differ from one another, the compressed mode is usually used in order to enable the measurements to be performed. In this context, messages are sent out at an increased data rate at the frequency currently used for communication so that the required measurements can be carried out at the other radio frequency in the time saved in this manner. However, this leads to increased interference. Subscriber stations which can communicate simultaneously in the two different frequency ranges (dual- or multi-mode devices) do not require the compressed mode but the measurements must be carried out simultaneously at the two different frequencies. In both cases, carrying out inter-frequency measurements results in increased battery consumption for the respective subscriber station.

Since the sizes of the radio cells FZ_F2 and FZ_F1 differ from one another, situations occur in which inter-frequency measurements do not need to be carried out. This applies, e.g. to a subscriber station, currently communicating in radio frequency range F2 which is located at location O1 of FIG. 1. Since its location O1 is outside the radio cell FZ_F1, there is no adequate reception of signals of the radio frequency range F1. The attempt of performing measurements in the radio frequency range F1, nevertheless, would thus be in vain. Since both the carrying out of inter-frequency measurements and the attempt of carrying out these measurements is associated with the disadvantages explained above, such vain attempts should be avoided.

In the text which follows, a method is described by which a subscriber station can decide whether it is meaningful to carry out inter-frequency measurements. For this purpose, the subscriber station measures the received level of the CPICH (common pilot channel) of the frequency range currently used by it at its current site. In the text which follows, the frequency range currently used by it is understood to be the frequency range in which the subscriber station evaluates signals from a base station and, if necessary, also sends signals to a base station. The CPICH is a channel radiated by broadcasting by the base station, which contains a fixed bit pattern for supporting the channel estimation of subscriber stations. In the text which follows, the received level of the CPICH in the frequency range F2 at the current site of a subscriber station is called F2_CPICH_RSCP, and F1_CPICH_RSCP in the frequency range F1.

From the CPICH or another signaling channel of the frequency range currently used by it for communication, the subscriber station takes a quantity, called F2_CPICH@FZ_F1_BOUNDARY in the text which follows, when the subscriber station currently communicates in the frequency range F2, or a quantity called F1_CPICH@FZ_F2_BOUNDARY if the subscriber station currently communicates in the frequency range F1. In this context, the quantity F2_CPICH@FZ_F1_BOUNDARY is a measure of the received level of the CPICH of frequency range F2 at the edge of the radio cell FZ_F1, and the quantity F1_CPICH@FZ_F2_BOUNDARY is a measure of the received level of the CPICH of the frequency range F1 at the edge of the radio cell FZ_F2.

The subscriber station compares its F2_CPICH_RSCP measurement with the quantity F2_CPICH@FZ_F1_BOUNDARY, or its F1_CPICH_RSCP measurement with the quantity F1_CPICH@FZ_F2_BOUNDARY in order to decide whether it is meaningful to carry out an inter-frequency measurement. If the F2_CPICH_RSCP measurement value exceeds the quantity F2_CPICH@FZ_F1_BOUNDARY, an inter-frequency measurement in the frequency range F1 is meaningful, if the F2_CPICH_RSCP measurement value is below the quantity F2_CPICH@FZ_F1_BOUNDARY, the inter-frequency measurement in the frequency range F1 should be dispensed with. This correspondingly applies to the comparison of the F1_CPICH_RSCP measurement value with the quantity F1_CPICH@FZ_F2_BOUNDARY.

If a subscriber station is located, for example, at location O1 and currently communicates in the frequency range F2, it finds that its F2_CPICH_RSCP measurement value is smaller than the quantity F2_CPICH@FZ_F1_BOUNDARY. This means that the subscriber station is more distant from the base station BS than the edge of the radio cell FZ_F1, i.e. that the subscriber station is located outside the radio cell FZ_F1. An inter-frequency measurement in the frequency range F1 is not meaningful, therefore. If, in contrast, the subscriber station is located at location O2, it finds that its F2_CPICH_RSCP measurement value is greater than the quantity F2_CPICH@FZ_F1_BOUNDARY. This means that the subscriber station is closer to the base station BS than the edge of the radio cell FZ_F1, i.e. that the subscriber station is located inside the radio cell FZ_F1. An inter-frequency measurement can therefore be carried out in the frequency range F1.

If, in contrast, the subscriber station is located at location O2 and currently communicates in frequency range F1, it finds that its F1_CPICH_RSCP measurement value is greater than the quantity F1_CPICH@FZ_F2_BOUNDARY For the given case where the radio cell FZ_ZL is a part of radio cell FZ_Z2, the quantity F1_CPICH@FZ_F2_BOUNDARY has the value of zero. This means that the subscriber station is closer to the base station BS than the edge of the radio cell FZ_F2, i.e. that the subscriber station is inside the radio cell FZ_F2. An inter-frequency measurement can be carried out, therefore, in the frequency range F2. This clearly applies to any site inside the radio cell FZ_F1.

To influence the sites at which subscriber stations carry out inter-frequency measurements or at what vicinity to the radio cell of the other frequency in each case such inter-frequency measurements are carried out, such threshold values THRESHOLD@FZ_F1 or THRESHOLD@FZ_F2 can be used by which the quantities F2_CPICH@FZ_F1_BOUNDARY and F1_CPICH@FZ_F2_BOUNDARY are changed. Using the threshold values makes it possible to carry out load balancing between the communications in frequency range F1 and F2. If, e.g., handovers are to be carried out increasingly from frequency range F2 into frequency range F1, a large value can be selected for THRESHOLD@FZ_F1 which must be subtracted from the F2_CPICH@FZ_F1_BOUNDARY value so that many subscriber stations carry out inter-frequency measurements in the frequency range F1. Using these threshold values, the following conditions are then obtained:

For subscriber stations which currently communicate in frequency range F2:

(1.1)
If
F2_CPICH_RSCP≥F2_CPICH@FZ_F1_BOUNDARY—THRESHOLD@FZ_F1 applies, an inter-frequency measurement in frequency range F1 is possible or necessary.

(1.2)
If
F2_CPICH_RSCP<F2_CPICH@FZ_F1_BOUNDARY—THRESHOLD@FZ_F1 applies, an inter-frequency measurement in frequency range F1 is not necessary. For subscriber stations which currently communicate in frequency range F1:

(2.1)
If
F1_CPICH_RSCP≥F1_CPICH@FZ_F2_BOUNDARY—THRESHOLD@FZ_F2 applies, an inter-frequency measurement in frequency range F2 is possible or necessary.

(2.2)
If
F1_CPICH_RSCP<F1_CPICH@FZ_F2_BOUNDARY—THRESHOLD@FZ_F2 applies, an inter-frequency measurement in frequency range F2 is not necessary.

This does not assume any knowledge of the subscriber station about which of the two radio cells FZ_F1 or FZ_F2 is the larger one.

The procedure described has the advantage that initially only intra-frequency measurements need to be carried out. These do not need the compressed mode so that initially these measurements do not cause any increase in interference. An inter-frequency measurement is carried out only when it is meaningful, namely when the subscriber station is located inside the respective other radio cell and the other radio cell is thus a potential candidate for a cell selection/reselection or a handover, respectively.

Figure 2:
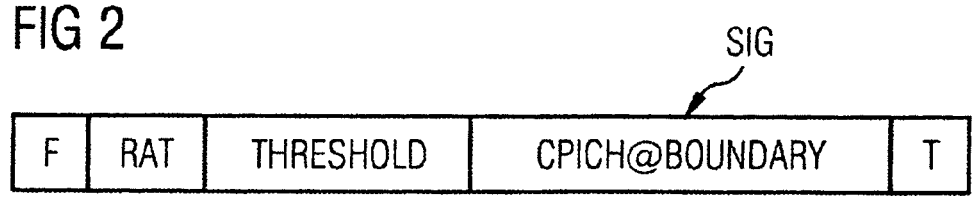
FIG. 2 shows the structure of a signaling message.

FIG. 2 shows the structure of a signaling message SIG by which a subscriber station is informed about the quantities needed by it for deciding about carrying out an inter-frequency measurement. The signaling message SIG is radiated in the frequency range in which the subscriber station currently communicates, preferably in the BCCH (Broadcast Control Channel). The SIG message contains the following information:

F: the radio frequency range to which the inter-frequency measurement is related;
optionally the quantity RAT: specifying the radio technology used in the radio frequency range F; THRESHOLD: the threshold value, explained above, of formulae (1.1), (1.2), (2.1) and (2.2); CPICH@BOUNDARY: the received level of the CPICH of the frequency range of radiation of the SIG message at the edge of the radio cell of the radio frequency range F; optionally the quantity T: indicates a time during which the quantities F, RAT, THRESHOLD and CPICH@BOUNDARY are valid.

Specification of the radio technology RAT can be dispensed with if the radio technology of the frequency range F and the radio technology of the frequency range of the SIG message is the same radio technology. Specifying the radio technology RAT supports handover between various types of radio communication systems such as, e.g. between a UMTS and a WiMAX system.

It is possible to depart from the order of the quantities F, RAT, THRESHOLD, CPICH@BOUNDARY and T, shown in FIG. 2. Furthermore, the SIG message can comprise other quantities, not shown in FIG. 2, such as, e.g. information relating to its own radio cell. The quantities F, RAT, THRESHOLD, CPICH@BOUNDARY and T can be sent out for a plurality of frequency ranges. In this case, the SIG message can comprise a plurality of records of these quantities, as an alternative, a separate SIG message can be used for each record.

If cell selection/reselection or handover to another radio cell are to be restricted, sending out the SIG signal with respect to the frequency range of this radio cell can be dispensed with. If the subscriber stations are allowed to perform inter-frequency measurements only if the comparison explained by formulae (1.1), (1.2), (2.1) and (2.2) has been carried out, the subscriber stations cannot carry out inter-frequency measurements in frequency ranges with respect to which they have not received an SIG signal.

Beyond its purpose explained hitherto, the quantity THRESHOLD can be used for signaling special situations:

If, for example, the radio cell FZ_F1 would not exist in FIG. 1 or not available temporarily, it is possible that, nevertheless, the quantities F, RAT, THRESHOLD, CPICH@BOUNDARY and T relating to the frequency range F1 are radiated in the signaling of the frequency range F2, a special value being set for the quantity THRESHOLD which indicates that the radio cell FZ_F1 is not available.

It may be meaningful, particularly for subscriber stations which have come into radio cell FZ_F2 through a handover from outside the radio cell FZ_F2, to provide information that the radio cell FZ_F1 is smaller than radio cell FZ_F2. This can be implemented, e.g. by establishing the quantity of THRESHOLD@FZ_F2 at a special value which indicates that the radio cell FZ_F2 comprises radio cell FZ_F1. If a subscriber station comes from a neighboring radio cell in which it has communicated in the frequency range F2, it can recognize briefly after the handover into radio cell FZ_F2, i.e. when it is at the edge of the radio cell FZ_F2, by the special value of the quantity of THRESHOLD@FZ_F2 that an inter-frequency measurement at radio frequency F1 is not necessary so that it initially only carries out intra-frequency measurements at radio frequency F2. A subscriber station of a neighboring radio cell which communicates there in frequency range F1 recognizes from the special value of the quantity of THRESHOLD@FZ_F2 that inter-frequency measurements have to be carried out at radio frequency F2. The formulae (2.1) and (2.2) explained above are still applicable for other subscriber stations, wherein the special value can be treated in such a manner as if it is zero, e.g. the special value of the quantity of THRESHOLD@FZ_F2 can be a negative value which is interpreted as zero by the subscriber stations for applications in the formulae (2.1) and (2.2).

In UTRA FDD, the size of a radio cell is established by the area within which subscriber stations can receive and evaluate the CPICH of the respective base station with sufficient quality. This extent is not constant, the cells can "breathe". If the level at which a base station is sending out its CPICH is changed, the respective quantity of CPICH@BOUNDARY must be adapted. The quantity of CPICH@BOUNDARY can be established as part of the radio network planning. The quantity of CPICH@BOUNDARY can also be determined, e.g. as described in the text which follows. This assumes that the quantity F2_CPICH@FZ_F1_BOUNDARY is to be redetermined, e.g. because the transmitted power of the CPICH of radio cell FZ_F2 has been changed.

1) In the network, the value of the received level of the CPICH of the radio cell FZ_F1 at the edge of radio cell FZ_F1 is established. The subscriber stations are informed that they should measure the received level of the CPICH of frequency F2 when they find that their current received level for the CPICH of frequency F1 corresponds to the established value. In this context, it is possible that not all subscriber stations are requested to carry out the measurements which are used for determining the quantity F2_CPICH@FZ_F1_BOUNDARY. The subscriber stations obliged to carry out the measurements can be selected, e.g., by each subscriber station being sent a random number in connected mode, these subscriber stations generating their own random number and comparing it with the received random number. Depending on whether its own random number is greater than or smaller than the received one, a subscriber station must carry out the measurements or not. During the selection of the subscriber station for measurement purposes, subscriber stations can also be preferably selected which do not need a compressed mode for carrying out the inter-frequency measurements and/or the battery power of which is less restricted.

2) The subscriber stations measure the received level of the CPICH both of radio cell FZ_F1 and of radio cell FZ_F2. If the received level of the CPICH of radio cell FZ_F1 corresponds to the value established in step 1), the value of the received level of the CPICH of radio cell FZ_F2 is measured and reported to the base station.

3) In the network, the measurement results conveyed by the subscriber stations are collected and from these the quantity F2_CPICH@FZ_F1_BOUNDARY is determined.

If the radio cell FZ_F2 is not an approximately circular radio cell, it is advantageous to carry out averaging or weighting of the measurement results. The value of the quantity F2_CPICH@FZ_F1_BOUNDARY calculated in the network is then sent out to the subscriber stations by the SIG signal as described above.

If the quantity F2_CPICH@FZ_F1_BOUNDARY is carried out for a plurality of transmitted powers of the CPICH of frequency range F2, it is possible to interpolate the quantity F2_CPICH@FZ_F1_BOUNDARY to other values of the transmitted powers of the CPICH of the frequency range F2.

Such a determination of the quantity F1_CPICH@FZ_F2_BOUNDARY is not necessary with respect to radio cell FZ_F1 since, according to FIG. 1, radio cell FZ_F1 is a component of the radio cell FZ_F2 so that the quantity F1_CPICH@FZ_F2_BOUNDARY is mandatorily set to zero.

Figure 3:
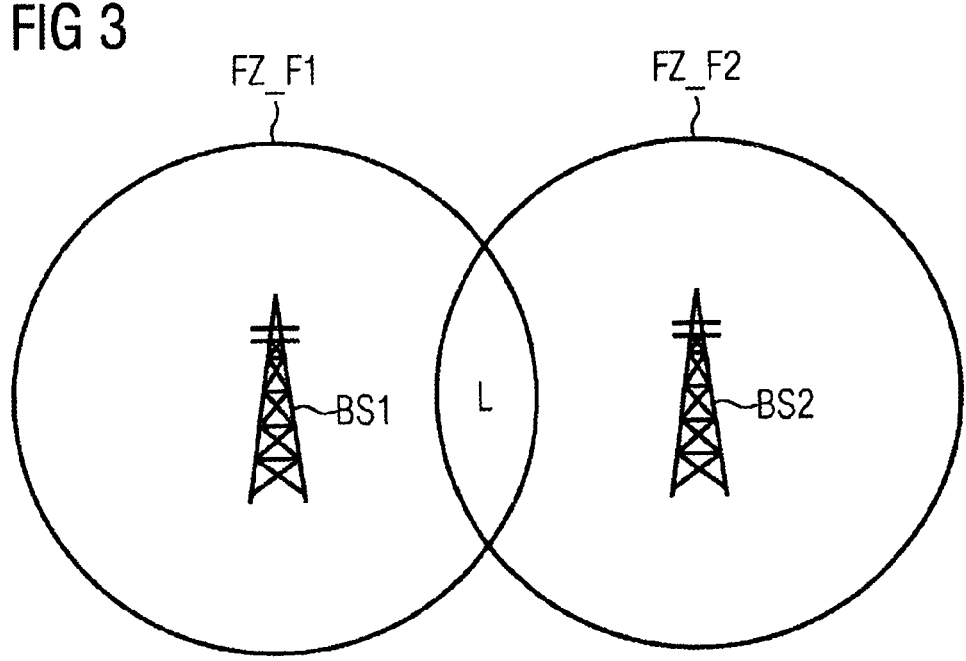
FIG. 3 shows a second section from a radio communication system.

Whereas FIG. 1 shows the case that base station BS supplies both radio cell FZ_F1 and radio cell FZ_F2, is also possible, as an alternative, that these are supplied by different base stations. Furthermore, the method and devices can also be applied to the case where the radio cell FZ_F1 is not a component of the radio cell FZ_F2 but that radio cells FZ_F1 and FZ_F2 are only overlapping radio cells as shown, for example, in FIG. 3. According to FIG. 3, a first base station BS1 supplies radio cell FZ_F1 and a second base station BS2, adjacent to the first base station, supplies radio cell FZ_F2, the two radio cells FZ_F1 and FZ_F2 having an area of overlap L at the edge. The method and devices allow a subscriber station located inside the area of overlap L to determine that it can carry out inter-frequency measurements, and a subscriber station located in the remaining part of radio cell FZ_F1 or FZ_F2 to determine that no inter-frequency measurements can be carried out. Correspondingly, the method can also be applied to a constellation according to which the two radio cells considered are overlapping sectors of a base station using certain antenna patterns, different frequency ranges being used for the different sectors.

In these cases, a more complex calculation than explained by formulae (1.1), (1.2), (2.1) and (2.2) is necessary in order to be able to decide whether inter-frequency measurements are to be carried out. This can include the following quantities:

The change in received level of the CPICH of the frequency range currently used for communication due to a movement of a subscriber station, i.e. a differentiation of this received level.

Received levels of CPICHs of adjacent radio cells in the frequency range currently used for communication.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for operating a mobile station in a wireless communication network with a base station, the method comprising:

receiving a first signal radiated inside a first radio coverage area at a first radio frequency;

receiving threshold information at the first radio frequency, the threshold information relating to a reception level of the first signal;

determining a received level of the first signal;

determining a received level of a second signal radiated inside a second radio coverage area at a second radio frequency based on a comparison of the received level of the first signal and the threshold information, the second radio frequency being from a same radio technology as the first radio frequency, and the second radio coverage area overlapping the first radio coverage area, wherein the threshold information relates to a measure of the received level of the first signal at the edge of the second radio coverage area, and wherein the first frequency and the second frequency comprise non-overlapping frequency bands.

2. The method as claimed in claim 1, wherein the receiver carries out a measurement on the second signal if the received level of the first signal is greater than a value indicated by the threshold information.

3. The method as claimed in claim 1, wherein the receiver does not perform a measurement on the second signal if the received level of the first signal is less than a value indicated by the threshold information.

4. The method as claimed in claim 1, wherein the threshold information is broadcast by the transmitter of the first signal.

5. The method as claimed in claim 1, wherein
the first radio coverage area is a subset of the second radio coverage area or the second radio coverage area is a subset of the first radio coverage area.

6. The method as claimed in claim 1, wherein
the receiver carries out a signal level measurement on the second signal, and
the measurement is used for deciding about a change from the first to the second radio frequency.

7. The method as claimed in claim 1, wherein
the threshold information is received by the receiver and a different mobile unit, and
the threshold information directly indicates to the different mobile unit that the different mobile unit should not make a measurement on the second signal.

8. The method as claimed in claim 1, wherein the threshold information is first determined with cooperation from a plurality of radio stations which carry out measurements on messages broadcast at the first and at the second radio frequencies.

9. The method as claimed in claim 2, wherein
the receiver does not perform a measurement on the second signal if the received level is less than a value indicated by the threshold information.

10. The method of claim 1, wherein at least one of the first frequency and the second frequency comprises a narrow frequency band.

11. The method of claim 1, wherein at least one of the first frequency and the second frequency comprises a wide frequency band.

12. A radio station for a radio communication system, comprising;
a receiver operable to receive a first signal radiated inside a first radio coverage area at a first radio frequency and receive threshold information at the first radio frequency, the threshold information relating to a reception level of the first signal;
a detector operable to determine a received level of the first signal; and
a decider operable to decide by comparing the received level of the first signal and the threshold information, whether to perform a measurement of a received level of a second signal radiated inside a second radio coverage area at a second radio frequency, the second radio frequency being from the same radio technology as the first radio frequency, and the second radio coverage area overlapping the first radio coverage area,
wherein the threshold information relates to a measure of the received level of the first signal at the edge of the second radio coverage area, and
wherein the first frequency and the second frequency comprise non-overlapping frequency bands.

* * * * *